United States Patent [19]
Freeborn
[11] 3,902,124
[45] Aug. 26, 1975

[54] STABLE AMPLITUDE SINE WAVE GENERATOR

[75] Inventor: John C. Freeborn, Los Angeles, Calif.
[73] Assignee: Honeywell Inc., Minneapolis, Minn.

[22] Filed: Jan. 30, 1974
[21] Appl. No.: 438,172

[52] U.S. Cl. .................................... 328/27; 307/229
[51] Int. Cl.[2] ............................................ H03K 5/08
[58] Field of Search ........ 331/109, 61; 328/27, 175; 307/229, 766

[56] References Cited

UNITED STATES PATENTS

| | | | |
|---|---|---|---|
| 3,278,860 | 10/1966 | Winn | 331/109 |
| 3,582,824 | 6/1971 | Lencioni, Jr. | 331/109 |
| 3,815,048 | 6/1974 | Hamlet | 331/109 |

*Primary Examiner*—Michael J. Lynch
*Assistant Examiner*—B. P. Davis

[57] ABSTRACT

Sine wave generator apparatus wherein an amplitude correction signal is produced by integrating peaks of the sinusoidal output signal which exceed a reference voltage indicative of desired output signal amplitude. The sinusoidal output signal is generated by a resonant circuit which is excited into oscillation by a variable amplitude periodic signal supplied by an input circuit which receives a square wave signal whose repetition rate is equal to the output signal frequency. Amplitude of the periodic signal is varied by the amplitude correction signal, thus controlling the excitation level of the resonant circuit and the amplitude of the sinusoidal signal generated thereby.

8 Claims, 2 Drawing Figures

STABLE AMPLITUDE SINE WAVE GENERATOR

BACKGROUND OF THE INVENTION

The invention herein described was made in the course of or under a contract, or subcontract thereunder, with the Department of the Navy.

The invention pertains generally to electronic sine wave generator circuits, and more specifically to precision generators for generating high purity, stable amplitude sinusoidal signals.

Electronic sine wave generators have long been useful and necessary components in a large variety of subsystems and systems. The different classes of applications for such generators place emphasis on different features and operational capabilities. Features of frequent interest include cost, simplicity, power consumption, and physical size and ruggedness. Operational capabilities of interest include frequency, amplitude and phase stability and/or range of operation, and purity of the generated signal.

The increasingly rapid growth of the use of digital computers in widely varied applications has given rise to increasingly frequent requirements for electronic signal generators of the type whose output signal is synchronized with computer operation and/or the operation of related input/output equipment. The requirement for synchronization capability may also be coupled with requirements for a very stable and pure sinusoidal output signal. One specific application in which such a combination of requirements exists involves a digital computer driven display of the high speed, spiral scan type. In such a display, the display writing means (typically the electron beam in a cathode ray tube) is deflected along a circular path by applying sine and cosine signals to orthogonally positioned deflection plates (or coils) in the CRT. High purity sinusoidal signals of very stable amplitude are required to avoid distortion in the display presentation. Further, position of the electron beam must be synchronized with the video data as it is generated by the computer or read from memory. It is, therefore, required that the sinusoidal signal generated by the sine wave generator be closely synchronized with the computer operations.

A variety of techniques and circuit designs for maintaining synchronism between a digital signal and a signal generator output signal have been devised. Likewise, numerous techniques and circuit designs exist for maintaining the purity and stability of a sinusoidal output signal. Signal generators for achieving the later requirement very frequently comprise a conventional type of resonant circuit (i.e., an L-C tank circuit) with some type of amplitude stabilization feedback arrangement. The feedback circuits take a variety of forms and are based on various principles of operation.

As an example, U.S. Pat. No. 3,117,288 issued to V. J. Modiano discloses a constant amplitude oscillator in which a Zener diode network is employed to directly limit the amplitude of the sinusoidal signal produced by a tank circuit. This results in attenuation of a feedback signal which is used to vary the tank circuit excitation signal. Variation of the excitation signal, in turn, results in regulation of the amplitude of the sinusoidal output signal.

U.S. Pat. Nos. 3,284,724 and 3,398,380 respectively issued to J. Marlow and D. F. G. Dwyer disclose amplitude stabilized oscillators in which the feedback signals control the oscillator supply voltages. U.S. Pat. No. 3,649,929 issued to J. E. Thompson discloses an oscillator with automatic gain control wherein current through a tank circuit and a balanced pair of driving transistors is regulated by sampling the sinusoidal output signal and using the sampled signal to adjust the gain of an amplifier which controls current through the tank circuit.

Although each of the previously discussed oscillator circuits includes feedback means for achieving amplitude stabilization, none of them is directed to such an oscillator circuit configured to permit synchronization with a digital signal. Nor does any of them disclose an oscillator circuit in which it appears that synchronization could be easily accomplished.

The applicant's generator fills such a requirement by employing a unique feedback arrangement which is compatible with means for directly synchronizing generator operation with a digital signal. In addition, the feedback arrangement is particularly effective in regulating generator operation to provide for generation of a very high purity sinusoidal signal.

SUMMARY OF THE INVENTION

The applicant's stable amplitude sine wave generator basically comprises a resonant circuit for producing a sinusoidal signal of predetermined frequency, an input circuit for supplying a variable amplitude periodic signal to the resonant circuit to excite it into oscillation, and a feedback circuit for supplying an amplitude correction signal to the input circuit, the amplitude correction signal being produced by integrating peaks of the sinusoidal output signal whose amplitude exceeds a reference voltage indicative of desired output signal amplitude. The input circuit includes means for receiving a square wave input signal having a repetition rate corresponding to the predetermined frequency from a digital clock or computer, and means for modifying the amplitude of the square wave signal in accordance with the amplitude correction signal. The amplitude corrected square wave signal may then be attenuated and filtered to produce a very low level periodic signal for exciting the resonant circuit. The feedback circuit includes means for sampling the sinusoidal output signal, comparing the sampled signal to a reference voltage indicative of desired output signal amplitude and transmitting to an integrating circuit only those portions of the sampled signal whose amplitude exceeds the reference voltage.

Accordingly, it is a primary object of this invention to provide an uncomplicated precision signal generator capable of synchronization with a digital signal.

It is a further object of this invention to provide a simple, reliable generator circuit capable of generating a high purity, stable amplitude sinusoidal signal.

It is yet a further object of this invention to provide a generator circuit including unique amplitude stabilizing feedback circuitry compatible with means for synchronizing generator operation with a digital signal.

Additional objects of the present invention may be ascertained from a study of the following disclosure, drawings, and appended claims.

DESCRIPTION OF THE PREFERRED EMBODIMENT

Figure 1:
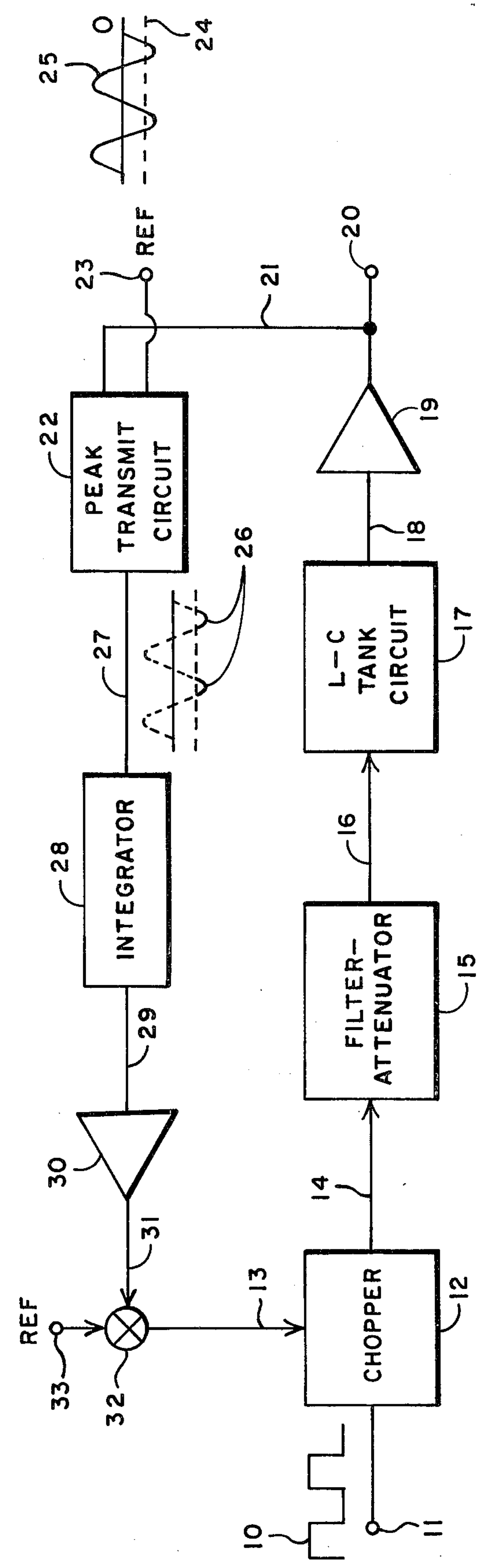
FIG. 1 is a block diagram of the applicant's stable amplitude sine wave generator, identifying the principal operations performed therein.

The block diagram of FIG. 1 illustrates a generator circuit in accordance with the applicant's invention including provisions for synchronizing the sinusoidal output signal with a digital clock input signal. The digital clock signal, identified by reference numeral 10, is applied to an input terminal 11 of a chopper 12 which receives an amplitude control signal on a conductor 13. The signal on conductor 13, which comprises a generally constant voltage indicative of the desired amplitude of the output signal, is chopped by means of chopper 12 to form a square wave signal on a conductor 14. The square wave signal on conductor 14 has the same period as digital clock signal 10 and an amplitude determined by the voltage on conductor 13. The signal on conductor 14 is filtered and attenuated by a filter-attenuator 15 to produce a very low level periodic signal on a conductor 16. The signal on conductor 16 has a frequency corresponding to the repetition rate of digital clock signal 10, and forms a driving signal for exciting a resonant L-C tank circuit 17 into oscillation. The driving signal on conductor 16 is sufficiently filtered and of sufficiently low level to cause negligible distortion in the sinusoidal signal generated by tank circuit 17. The sinusoidal signal generated by tank circuit 17 is supplied through a conductor 18 to an amplifier 19. Amplifier 19 increases the amplitude of the sinusoidal signal produced by tank circuit 17 to the level required by apparatus connected to an output terminal 20.

A sample of the sinusoidal output signal at output terminal 20 is supplied through a conductor 21 to a peak transmit circuit 22. An amplitude reference voltage indicative of the desired amplitude of the sinusoidal output signal is also supplied to peak transmit circuit 22 through a terminal identified by reference numeral 23. Reference numeral 24 identifies a graphic representation of the amplitude reference voltage which is shown negative with respect to ground potential, which is labelled "0". Reference numeral 25 identifies a graphic representation of a sample of a sinusoidal output signal produced at terminal 20. As shown, output signal 25 oscillates about ground potential, and is of such an amplitude that its negative peaks are slightly more negative than reference voltage 24.

Peak transmit circuit 22 transmits only the negative peak portions of signal 25 which are more negative than reference voltage 24. The transmitted peaks are illustrated in solid lines identified by reference numeral 26 and appear on a conductor 27. The signal on conductor 27 is integrated by means of an integrator circuit 28 to produce a generally constant voltage on a conductor 29 indicative of the amplitude correction required to return the sinusoidal output signal on terminal 20 to the amplitude corresponding to the reference voltage on terminal 23.

The signal on conductor 29 is amplified as necessary by an amplifier 30, and supplied through a conductor 31 to a summing means 32. A reference voltage at a terminal 33 is also supplied to summing means 32. Summing means 32 functions to combine the signals on conductor 31 and at terminal 33 to produce the amplitude control signal on conductor 13.

Figure 2:
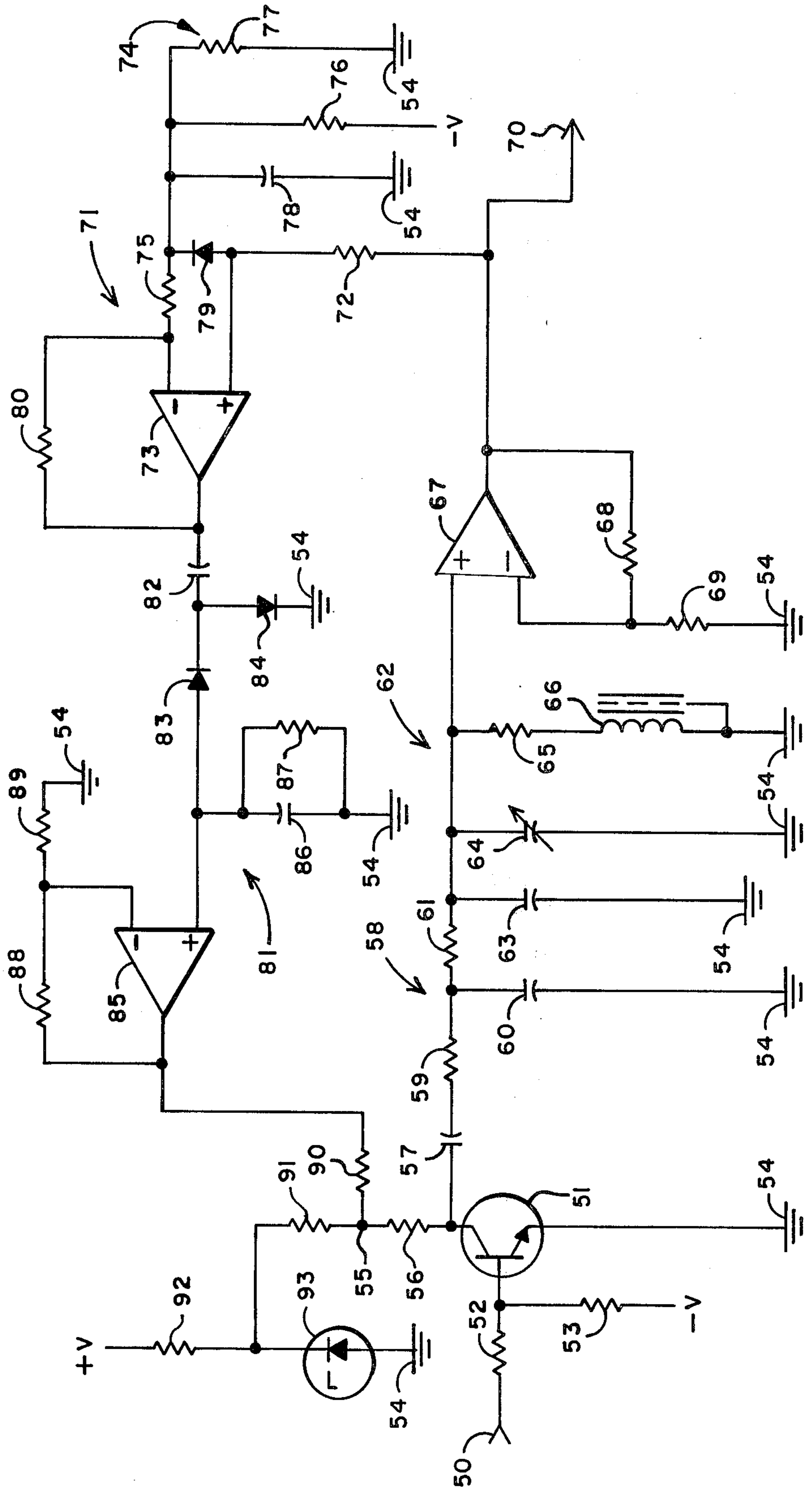
FIG. 2 is a circuit diagram of generator apparatus in accordance with the applicant's invention.

A specific embodiment of a generator circuit in accordance with the block diagram of FIG. 1 as illustrated in FIG. 2. An input terminal identified by reference numeral 50 is provided for receiving a digital clock signal in the form of a square wave. Terminal 50 is connected to the base of an NPN transistor 51 through a resistor 52. Transistor 51 is biased to a normally nonconducting state by a negative bias voltage supplied to its base through a resistor 53. The emitter of transistor 51 is connected to a source of reference potential 54 shown as ground or zero potential. The collector of transistor 51 is connected to a junction 55 through a resistor 56. As will be discussed hereinafter, the voltage at junction 55 controls the amplitude of the sinusoidal output signal produced by the generator circuit.

The signal at the collector of transistor 51 is chopped at a repetition rate equal to the repetition rate of the square wave signal supplied to input terminal 50. Transistor 51, and its associated circuitry serves to combine or sum the substantially constant voltage supplied to its collector and the square wave signal supplied to its base.

The collector of transistor 51 is connected through a voltage shifting capacitor 57 to a filterattenuator network generally identified by reference numeral 58. The filter portion of network 58 comprises a resistor 59 and a capacitor 60 connected between capacitor 57 and ground 54. an attenuator resistor 61 is connected to between the junction of resistor 59 and capacitor 60 and a resonant circuit or inductor-capacitor tank circuit generally identified by reference numeral 62. Resonant circuit 62 comprises a pair of capacitors 63 and 64 each connected between resistor 61 and ground 54. Capacitor 64 is shown as a variable capacitor, and is used for trimming purposes. Resonant circuit 62 also includes a resistor 65 and an inductor 66 connected in series between resistor 61 and ground 54. The junction between capacitors 63 and 64 and resistor 65 forms the output terminal of resonant circuit 62, and is connected to the noninverting input terminal of an amplifier 67. A stabilizing negative feedback network comprising resistors 68 and 69 is connected between the output terminal of amplifier 67, ground 54, and the inverting input terminal of the amplifier. The output terminal of amplifier 67 is connected to an output terminal 70 of the sine wave generator circuit.

The sinusoidal output signal at output terminal 70 is sampled, processed, and fed back to junction 55 through feedback circuitry generally identified by reference numeral 71. Specifically, output terminal 70 is connected through a resistor 72 to the noninverting input terminal of an amplifier 73. The inverting input terminal of amplifier 73 is connected to an amplifier reference circuit or reference voltage means generally identified by reference numeral 74 through a resistor 75. Amplitude reference circuit 74 comprises a pair of resistors 76 and 77 connected in series between a source of negative voltage designated −V and ground 54. Resistor 75 is connected to the junction between resistors 76 and 77. A filter capacitor 78 is also connected between resistor 75 and ground 54. In addition, the noninverting input terminal of amplifier 73 is connected to the junction of resistors 75, 76, and 77 through a diode 79. Diode 79 is oriented so that its anode is connected to the noninverting input terminal and its cathode is connected to the junction between the resistors. A feedback resistor 80 is connected between the output terminal of amplifier 73 and its inverting input terminal.

The output terminal of amplifier 73 is coupled to an integrating circuit generally identified by reference numeral 81 through a capacitor 82. Specifically, capacitor 82 is connected to the junction between a pair of diodes 83 and 84 which are connected between the noninverting input terminal of an amplifier 85 and ground 54. Diodes 83 and 84 are oriented so that the cathode of diode 83 and the anode of diode 84 are connected to capacitor 82.

An integrating capacitor 87 and a resistor 86 in parallel therewith are connected between the anode of diode 83 and ground 54. The output terminal of amplifier 85 is connected to its inverting input terminal through a stabilizing negative feedback resistor 88. The inverting input terminal is also connected to ground 54 through a resistor 89. The output terminal of amplifier 85 is connected to junction 55 through a resistor 90.

Junction 55 is also supplied with a positive voltage through a resistor 91 which is connected to a reference voltage source comprising a resistor 92 and a voltage regulator 93 connected in series between a positive voltage source designated +V and ground 54. Resistor 91 is connected to the junction between resistor 92 and voltage regulator 93.

The general operation of the applicant's stable amplitude sine wave generator can be understood by reference to the block diagram of FIG. 1. Square wave digital clock signal 10 and a voltage indicative of the desired amplitude of the sinusoidal output signal are supplied to chopper 12 through terminal 11 and conductor 13 respectively. Chopper 12 chops the voltage on conductor 13 at the repetition rate of digital clock signal 10. The signal produced by chopper 12, which appears on conductor 14, is a square wave having the same repetition rate as digital clock signal 10 and an amplitude determined by the voltage on conductor 13. The square wave on conductor 14 is filtered and attenuated by filter-attenuator 15 to produce a very low level periodic signal on conductor 16. The signal on conductor 16 serves to excite resonant L-C tank circuit 17 into oscillation. Tank circuit 17 is designed to have a resonant frequency approximately equal to the repetition rate of digital clock signal 10. The purpose of utilizing a low level signal to excite tank circuit 17 is to minimize distortion in the sinusoidal signal generated thereby. The sinusoidal signal generated by tank circuit 17 is amplified by amplifier 19 to a suitable level. The amplified sinusoidal signal appears at output terminal 20.

A sample of the sinusoidal output signal at output terminal 20, as illustrated at 25, is supplied to peak transmit circuit 22 through conductor 21. Peak transmit circuit 22 also receives a negative amplitude reference voltage, as illustrated at 24, through terminal 23. Peak transmit circuit 22 serves to transmit only negative peak portions of signal 25 whose amplitude exceeds reference voltage 24, as shown at 26. If the amplitude of the negative peaks does not exceed reference voltage 24, the output signal from peak transmit circuit 22, which appears on conductor 27, remains at zero or ground level.

The output signal from peak transmit circuit 22 is supplied to integrator 28. If the signal comprises a series of negative peaks, the output signal from integrator 28 is a negative going step function. Conversely, if the output signal from peak transmit circuit 22 is at ground level, the output signal from integrator 28 is also at ground level.

The output signal from integrator 28 is supplied through conductor 29 to amplifier 30 where it is amplified to a suitable level for feedback or amplitude control purposes. The output signal from amplifier 30, which is either a zero or a negative voltage is combined with a positive reference at terminal 33 by means of summing device 32. The summation or combination of voltages supplied to summing device 32 comprises the amplitude control signal supplied to chopper 12 on line 13.

Thus, if the amplitude of the sinusoidal output signal on terminal 20 exceeds the amplitude corresponding to reference voltage 24, peak transmit circuit 22 transmits a series of negative peaks which are integrated by integrator 28 to form a negative amplitude correction voltage. The amplitude correction voltage is amplified and serves to reduce the amplitude control voltage supplied to chopper 12. As a result, the level of the driving or exciting signal supplied to tank circuit 17 is decreased, thereby reducing the amplitude of the sinusoidal output signal at terminal 20 to the amplitude corresponding to amplitude reference voltage 24.

Operation of a specific embodiment of a stable amplitude sine wave generator in accordance with the applicant's invention can be understood by reference to the circuit diagram of FIG. 2. A square wave digital clock signal is supplied to the generator at input terminal 50. This results in a corresponding signal at the base of transistor 51 which is biased to a normally nonconducting state. The voltage at the collector of transistor 51 is indicative of the desired amplitude of the sinusoidal output signal. Transistor 51 serves to chop the voltage at its collector. The resulting signal, which is supplied to capacitor 57 is a square wave signal having the same repetition rate as the digital clock signal supplied to input terminal 50, but inverted therefrom. The instantaneous amplitude of the square wave signal supplied to capacitor 57 is always positive, and is determined by the voltage supplied to the collector transistor 51.

Capacitor 57 performs a voltage shifting function, and has as its output signal a bipolar square wave. Capacitor 57 is of relatively large capacitance so as to provide large coupling for alternating signals. The output signal of capacitor 57 is supplied to filter capacitor 60 through resistor 59 which is sized to preserve the large coupling of capacitor 57. Filter capacitor 60 serves to attenuate signal components above a predetermined frequency, thereby tending to convert the square wave into a sinusoidal signal. Resistor 61 performs a signal attenuation function and reduces amplitude of the filtered signal to a very low level. This signal is used to excite resonant circuit 62 which comprises capacitors 63 and 64, resistor 65 and inductor 66. The sizes of these components are chosen so that the resonant frequency of circuit 62 is approximately equal to the repetition rate of the digital clock signal supplied at input terminal 50. Use of a low level driving or exciting signal results in generation of a high purity sinusoidal signal by resonant circuit 62. This sinusoidal signal is amplified to a suitable level by amplifier 67 which supplies the sinusoidal output signal to output terminal 70.

The amplitude of the sinusoidal output signal at output terminal 70 is precisely controlled by means of feedback circuitry 71. A sample of the output signal is supplied to the feedback circuitry through resistor 72. The amplitude level is determined by an amplitude reference voltage produced by voltage divider 74. The negative amplitude reference voltage is supplied to the inverting input terminal of amplifier 73 through resistor 75. The output signal from amplifier 73 is also supplied to its inverting input terminal through resistor 80. The sizes of resistors 75 and 80 are selected to provide high gain from amplifier 73.

The sample of the sinusoidal output signal provided through resistor 72 is supplied to the noninverting input of amplifier 73. However, diode 79 prevents any voltage more positive than the amplitude reference voltage from reaching the noninverting input. Thus, a negative input signal is supplied to the noninverting input only when the sinusoidal output signal has negative peaks of a greater amplitude than the amplitude reference voltage.

The output signal of amplifier 73 is coupled through capacitor 82 to a diode network comprising diodes 83 and 84. Diode 84 prevents the output signal from capacitor 82 from becoming excessively positive and maintains diode 83 on the threshold of conduction. Any negative peaks produced by amplifier 73 are coupled through capacitor 82 cause diode 83 to conduct, thereby transmitting the negative peaks to integrator circuit 81. Such negative peaks result in charging of capacitor 86. Parallel bleed resistor 87 is of sufficiently high resistance that minimal discharging of capacitor 86 occurs between successive peaks. Thus, if the amplitude of the sinusoidal output signal is greater than the amplitude set by the amplitude reference voltage, capacitor 86 is charged in a negative step manner. This, in turn, results in step decreases in the voltage supplied to the noninverting input terminal of amplifier 85. The input signal to amplifier 85 is amplified to a suitable level and supplied through resistor 90 to junction 55.

In the absence of an output signal from amplifier 85, junction point 55 is supplied only with a voltage through resistor 91. The voltage is a positive voltage controlled by voltage regulator 93, and is of sufficient magnitude to result in generation of a sinusoidal output signal having an amplitude greatly in excess of its desired amplitude. Any output from amplifier 85 results in a decrease in the voltage at junction 55, and a corresponding decrease in the voltage supplied to the collector of transistor 51. Such a decrease results in a lower level exciting signal for resonant circuit 62 which, in turn, decreases the amplitude of the sinusoidal output signal at terminal 70 to bring it into agreement with the amplitude reference voltage.

In accordance with the foregoing description, the applicant's unique stable amplitude sine wave generator is capable of producing a sinusoidal signal of exceptional amplitude stability and purity, thus making it useful in a variety of applications in which precise sinusoidal signals are required. In addition, the applicant's invention includes simple and effective means for synchronizing the sinusoidal output signal with digital signals, thus making it compatible and useful with digital computers and other digital apparatus. Although a specific embodiment has been shown and described for illustrative purposes, other embodiments which do not depart from the applicant's contemplation and teaching will be apparent to those skilled in the art. The applicant does not intend that coverage be limited to the disclosed embodiment, but only by the terms of the appended claims.

What is claimed is:

1. In a stable amplitude sine wave generator of the type wherein a resonant circuit produces an oscillating output signal which is sampled to provide an amplitude correction signal, improved feedback circuitry which comprises:

input circuit means for supplying a square wave signal having a repetition rate corresponding to the desired frequency of the oscillating output signal and a variable amplitude depending on the amplitude correction signal;

reference voltage means for providing a reference voltage of a given polarity relative to ground potential, the magnitude of the reference voltage being indicative of desired amplitude of the oscillating output signal;

signal blocking means for receiving the oscillating output signal and the reference voltage and transmitting only the portion of the output signal whose voltage amplitude in the given polarity exceeds the reference voltage;

integrating means for integrating the signal transmitted by said signal blocking means; and correction circuit means for receiving the signal from said integrating means supplying a signal indicative thereof to said input circuit means as the amplitude correction signal.

2. The sine wave generator of claim 1 wherein said resonant circuit comprises:

an inductor-capacitor tank circuit; and filter-attenuator means connecting said amplitude control means to said inductor-capacitor tank circuit.

3. The sine wave generator of claim 2 wherein said signal blocking means comprises:

an amplifier circuit having inverting and inverting inputs and an output;

first means for supplying the reference voltage to one of the inverting and non-inverting inputs of said amplifier circuit;

second means for supplying a sample of the oscillating output signal to the other of the inverting and non-inverting inputs of said amplifier circuit; and diode means connecting the inverting and noninverting inputs of said amplifier circuit.

4. The sine wave generator of claim 3 wherein:

said first means includes a series impedance having a first terminal connected to said reference voltage means and a second terminal connected to the inverting input of said amplifier circuit;

the output of said amplifier circuit is connected to the inverting input thereof through a feedback impedance so that its output signal is normally at ground potential;

the sample of the oscillating output signal is supplied to the non-inverting input of said amplifier circuit; and , said diode means includes a cathode connected to the first terminal of said series impedance and an anode connected to the non-inverting input of said amplifier circuit.

5. A stable amplitude sine wave generator comprising:

input circuit means for supplying a variable amplitude periodic signal of a predetermined repetition rate, the amplitude being dependent on a feedback signal;

resonant circuit means responsive to the signal supplied by said input circuit means for producing an oscillating output signal of a frequency equal to the predetermined repetition rate and of an amplitude in accordance with the signal supplied by said input circuit means;

a peak transmitting circuit for sampling the oscillating output signal and transmitting only first polarity peaks thereof whose amplitude exceeds a reference voltage;

integrating means for integrating the signal peaks transmitted by said peak transmitting circuit to form an amplitude correction signal; and means for supplying a signal indicative of the amplitude correction signal to said input circuit means as the feedback signal.

6. The sine wave generator of claim 5 wherein said peak transmitting circuit comprises:

an amplifier circuit having an output terminal at which a first intermediate signal is produced in response to signals supplied to inverting and non-inverting input terminals thereof;

an amplitude reference circuit for providing a first polarity reference voltage indicative of the desired amplitude of the oscillating output signal;

intermediate feedback means responsive to the first polarity reference voltage and the first intermediate signal for supplying a second intermediate signal to one of the input terminals of said amplifier circuit so that the first intermediate signal is normally at ground potential; and sampling means for sampling the oscillating output signal and supplying to the other input terminal of said amplifier circuit only first polarity portions of the sample whose amplitude exceeds the reference voltage.

7. The sine wave generator of claim 6 wherein:

said amplitude reference circuit provides a negative reference voltage;

said intermediate feedback means comprises a first impedance element having a first terminal impressed with the negative reference voltage and a second terminal connected to the inverting input of said amplifier circuit, and a second impedance element connected between the output and inverting input terminals of said amplifier circuit; and said sampling means comprises a third impedance element for supplying a sample of the oscillating output signal to the non-inverting input of said amplifier circuit, and diode means for limiting the non-inverting input terminal to a voltage no more positive than the negative reference voltage.

8. The sine wave generator of claim 7 wherein said input circuit means includes means for receiving a square wave signal of the predetermined period and means for combining therewith the feedback signal to form the variable amplitude periodic signal for exciting said resonant circuit means.

* * * * *

UNITED STATES PATENT OFFICE
CERTIFICATE OF CORRECTION

PATENT NO. : 3,902,124
DATED : August 26, 1975
INVENTOR(S) : JOHN C. FREEBORN

It is certified that error appears in the above-identified patent and that said Letters Patent are hereby corrected as shown below:

Claim 3, line 3, cancel "inverting" (second occurrence) and substitute --non-inverting--.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*